(12) United States Patent
Haus et al.

(10) Patent No.: US 12,186,912 B2
(45) Date of Patent: Jan. 7, 2025

(54) CAPABILITY-AWARE PATHFINDING FOR AUTONOMOUS MOBILE ROBOTS

(71) Applicant: Gideon Brothers d.o.o., Osijek (HR)

(72) Inventors: Tomislav Haus, Donja Stubica (HR); Matija Žigić, Ivanja Reka (HR); Josip Ćesić, Zagreb (HR)

(73) Assignee: GIDEON BROTHERS D.O.O., Osijek (HR)

( * ) Notice: Subject to any disclaimer, the term of this patent is extended or adjusted under 35 U.S.C. 154(b) by 127 days.

(21) Appl. No.: 17/582,407

(22) Filed: Jan. 24, 2022

(65) Prior Publication Data

US 2023/0129346 A1 Apr. 27, 2023

Related U.S. Application Data

(60) Provisional application No. 63/270,373, filed on Oct. 21, 2021.

(51) Int. Cl.
*B25J 9/16* (2006.01)
*G05D 1/00* (2024.01)

(52) U.S. Cl.
CPC ........... *B25J 9/1666* (2013.01); *B25J 9/1664* (2013.01); *G05D 1/0212* (2013.01)

(58) Field of Classification Search
CPC ....... B25J 9/1666; B25J 9/1664; G01C 21/20; G05D 1/0274; G05D 2201/02; G05D 1/0217; G05D 1/0212
See application file for complete search history.

(56) References Cited

U.S. PATENT DOCUMENTS

| | | | |
|---|---|---|---|
| 11,506,505 B2 * | 11/2022 | Pheiffer | G01C 21/3446 |
| 2018/0359907 A1 * | 12/2018 | Kelley | G05D 1/0219 |
| 2020/0073396 A1 * | 3/2020 | Shimizu | G05D 1/0219 |

(Continued)

OTHER PUBLICATIONS

J. P. Rastelli, R. Lattarulo and F. Nashashibi, "Dynamic trajectory generation using continuous-curvature algorithms for door to door assistance vehicles,", 2014 IEEE Intelligent Vehicles Symposium Proceedings (Jun. 8-11, 2014), Dearborn, MI, USA, 2014, pp. 510-515, doi: 10.1109/IVS.2014.6856526 (Year: 2014).*

(Continued)

*Primary Examiner* — Khoi H Tran
*Assistant Examiner* — Christopher Scott
(74) *Attorney, Agent, or Firm* — Fenwick & West LLP

(57) ABSTRACT

An autonomous mobile robot uses a capability-aware pathfinding algorithm to traverse from a start pose to an end pose efficiently and effectively. The robot receives a start pose and an end pose, and determines a primary path from the start pose to the end pose based on a primary pathfinding algorithm. The robot may smooth the primary path using Bezier curves. The robot may identify a conflict point on the primary path where the robot cannot traverse, and may determine a secondary path from a first point before the conflict point to a second point after the conflict point. The secondary path may use a secondary pathfinding algorithm that uses motion primitives of the robot to generate the secondary path based on the motion capabilities of the robot. The robot may then traverse from the start pose to the end pose based on the primary path and the secondary path.

14 Claims, 13 Drawing Sheets

(56) References Cited

U.S. PATENT DOCUMENTS

| | | | | |
|---|---|---|---|---|
| 2021/0132615 A1* | 5/2021 | Passot | .................. | G05D 1/0217 |
| 2022/0073101 A1* | 3/2022 | Wang | ................. | B62D 15/0285 |
| 2022/0342421 A1* | 10/2022 | Kearns | ................. | G05D 1/0219 |
| 2023/0012987 A1* | 1/2023 | Wang | ................... | G05D 1/0238 |
| 2023/0273031 A1* | 8/2023 | Cai | ...................... | G05D 1/0217 |
| | | | | 701/26 |

OTHER PUBLICATIONS

I. Noreen, "Collision free smooth path for mobile robots in cluttered environment using an economical clamped cubic b-spline", Symmetry, vol. 12, No. 9 (Sep. 22, 2020), pp. 1567 (Year: 2020).*

* cited by examiner

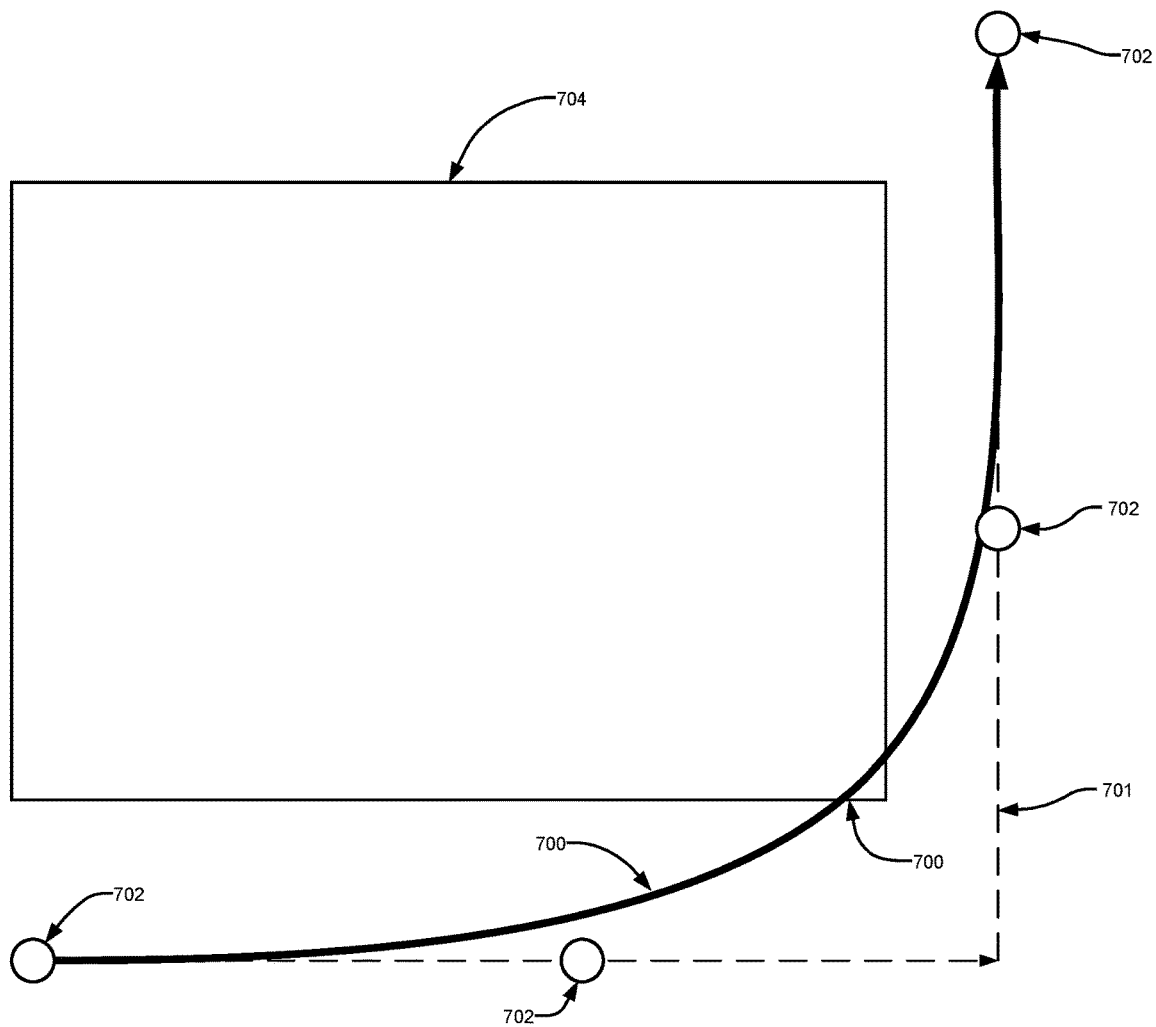
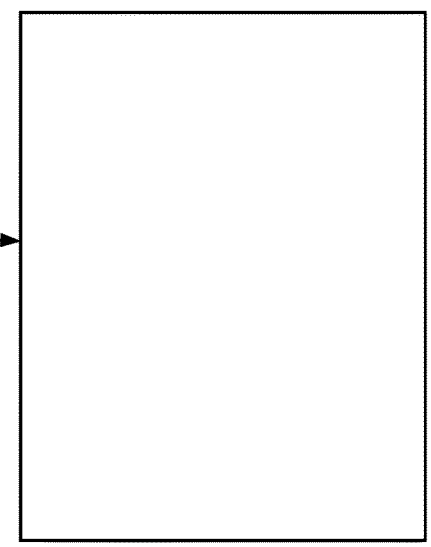
FIG. 7A

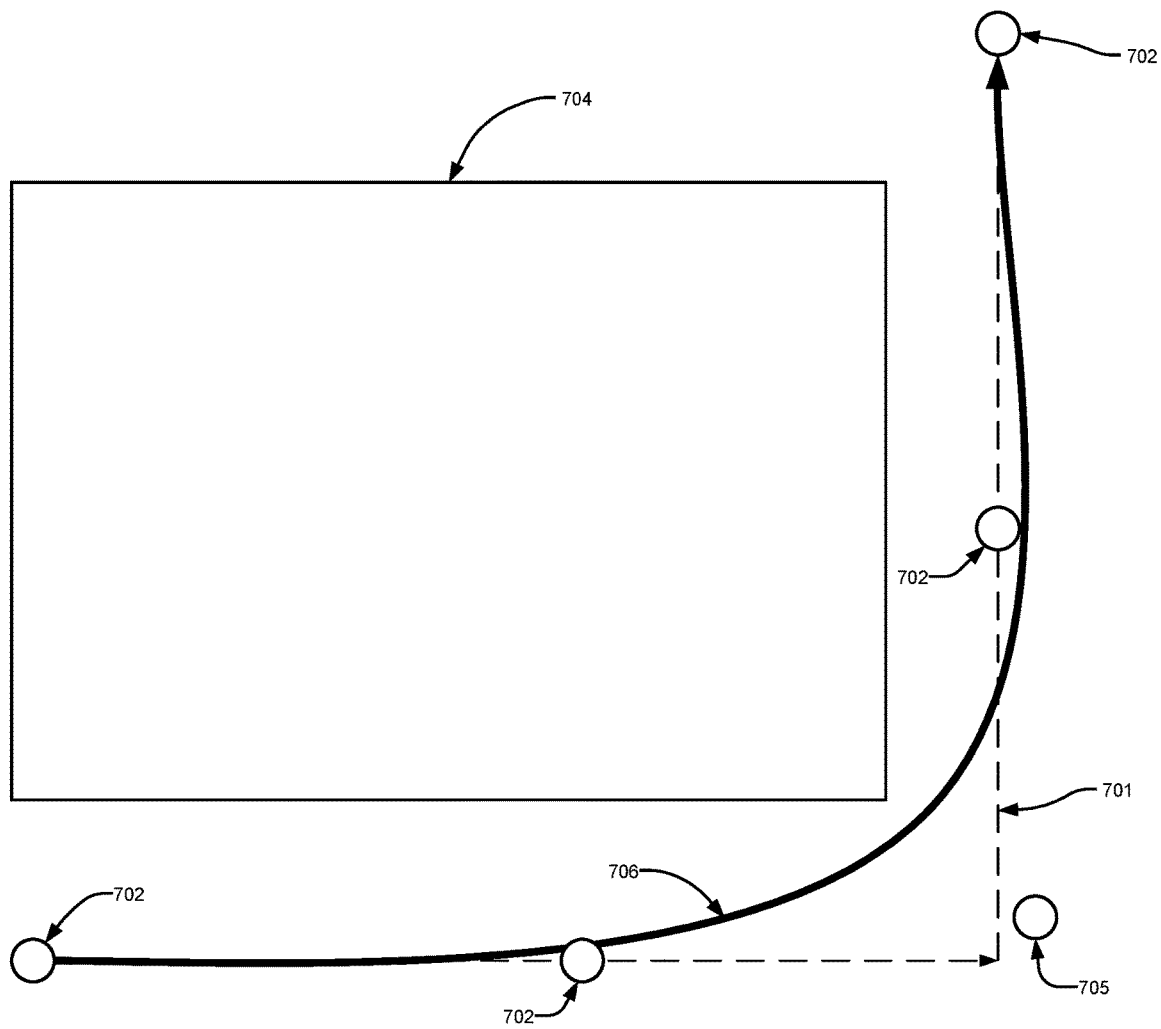
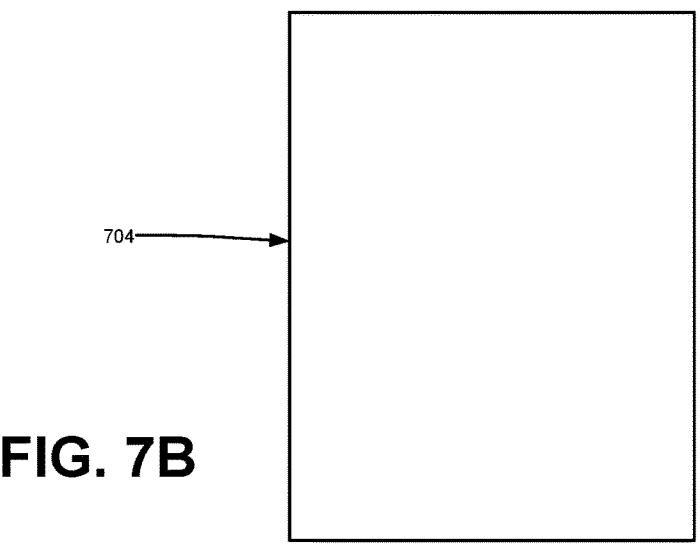
FIG. 7B

CAPABILITY-AWARE PATHFINDING FOR AUTONOMOUS MOBILE ROBOTS

CROSS-REFERENCE TO RELATED APPLICATIONS

This application claims priority to U.S. Provisional Patent Application No. 63/270,373, entitled "Capability-Aware Pathfinding for Autonomous Mobile Robots" and filed Oct. 21, 2021, the contents of which are hereby incorporated by reference herein in its entirety.

Additionally, U.S. patent application Ser. No. 17/138,444 represents some example contexts within which capability-aware pathfinding may be used, the contents of which are hereby incorporated by reference herein in its entirety. However, the present disclosure is not limited to those example contexts and may be applied in other contexts as well.

BACKGROUND

Autonomous mobile robots are capable of traversing their environments, manipulating objects, and avoiding obstacles. These robots may use pathfinding algorithms to traverse from a starting location to an end location while avoiding obstacles within their environment. However, conventional pathfinding algorithms often have tradeoffs between efficiency and accuracy, i.e., conventional pathfinding algorithms are typically either computationally expensive yet accurate or quick to calculate but less accurate. An autonomous mobile robot using a conventional pathfinding algorithm is therefore unable to achieve accurate pathfinding results within a short time span.

Furthermore, conventional pathfinding algorithms often fail to sufficiently account for the movement capabilities of the robot that is taking the path generated by these algorithms. Typically, these conventional algorithms assume that the robot is capable of moving in any direction, and that if the robot needs to turn to travel in a direction, the robot is capable of turning in-place. However, many robots have a turning radius that might prohibit them from easily taking sharp turns without colliding with an obstacle. Thus, conventional pathfinding algorithms may not be applicable to some autonomous mobile robots.

SUMMARY

An autonomous mobile robot may use a capability-aware pathfinding algorithm to navigate within an environment efficiently and effectively. The robot may receive a start pose from which the robot should start traversing and an end pose to which the robot should traverse. The start pose may be based on the robot's current location, or some other pose within the robot's environment.

The robot determines a primary path from the start pose to the end pose. The robot may determine the primary path based on a primary pathfinding algorithm that determines the primary path based on obstacles in the robot's environment. For example, the primary pathfinding algorithm may assign a cost to coordinates within the environment based on the proximity of the coordinates to obstacles. Furthermore, the primary pathfinding algorithm may use a heuristic to generate the primary path. For example, the primary pathfinding algorithm may use a Euclidean distance or a cost gradient as a heuristic to generate the primary path. In some embodiments, the primary pathfinding algorithm uses the A* search algorithm to generate the primary path.

The robot may apply a smoothing algorithm to the primary path. For example, the robot may use Bezier curves for segments of the primary path to smooth the primary path. In some embodiments, the robot applies a recursive process to smooth the primary path. For example, the robot may identify a set of segments along the primary path and generate a Bezier curve for each segment. The robot may determine whether the Bezier curve for each segment would cause the robot to collide with, or come within some threshold distance of, an obstacle. Responsive to the robot determining that the Bezier curve for a segment would cause the robot to collide with an obstacle, the robot may generate a new higher-order Bezier curve for the segment based on an additional control point. The additional point may be based on a midpoint between two other control points or an area around a midpoint of the segment of the primary path.

The robot may identify conflict points on the smoothed primary path. A conflict point is a point, pose, place, or segment on the primary path where the robot is not capable of traversing given the robot's motion capabilities. For example, the primary path may include a conflict point at locations where the primary path assumes that the robot can rotate in place, but the robot is incapable of doing so. In some embodiments, the primary path may include a conflict point at the start pose or the end pose because the start pose or end pose requires the robot to start or end in an orientation that the robot is incapable of achieving. For example, the primary path may require the robot to rotate in place to enter the primary path from the start pose, or may require the robot to rotate in place to achieve a correct orientation for the end pose.

Responsive to the robot identifying a conflict point on the smoothed primary path, then the robot may determine a secondary path between a first point on the primary path and a second point on the primary path. The first point may be a point on the primary path that comes before the conflict point, and the second point may be a point on the primary path that comes after the conflict point. In some embodiments, the first point and/or the second point overlap with the start pose, the end pose, the conflict point, and/or the current location of the robot. For example, the first point may be the start pose if the primary path requires the robot to rotate in place to enter the primary path, and the second point may be the end pose if the primary path requires the rotate in place to achieve a correct orientation for the end pose.

The robot may determine the secondary path such that the secondary path is optimized based on obstacles in the environment, the motion capabilities of the robot, and/or the contours of the primary path. For example, the robot may determine the secondary path based on a secondary pathfinding algorithm that generates the secondary path. The secondary pathfinding algorithm may generate the secondary path based on motion primitives of the robot. For example, the secondary pathfinding algorithm may perform a search over motion primitives of the robot to determine a series of motion primitives that would result in the robot traveling form the first point to the second point.

The robot may traverse along the primary path from the start pose to the first point. When the robot reaches the first point, the robot may then traverse along the secondary path from the first point to the second point. The robot may then traverse along the primary path from the second point to the end pose.

By using a capability-aware pathfinding algorithm to traverse an environment, the robot can achieve an effective path through the environment with relatively minimal computational requirements. This benefit stems from the fact that the robot uses the primary pathfinding algorithm to generate a primary path, and may only modify the primary path with a more-computationally expensive secondary pathfinding algorithm for the portions of the primary path where the robot cannot traverse. Thus, the capability-aware pathfinding algorithm improves on conventional pathfinding algorithms by generating a path that the robot is capable of traversing without having to consider the motion capabilities of the robot when generating the entire path.

BRIEF DESCRIPTION OF THE DRAWINGS

FIG. 7A-B illustrates an exemplary process by which new control points are added to generate smoothed segment of a primary path, in accordance with some embodiments.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Environment

Figure 1:
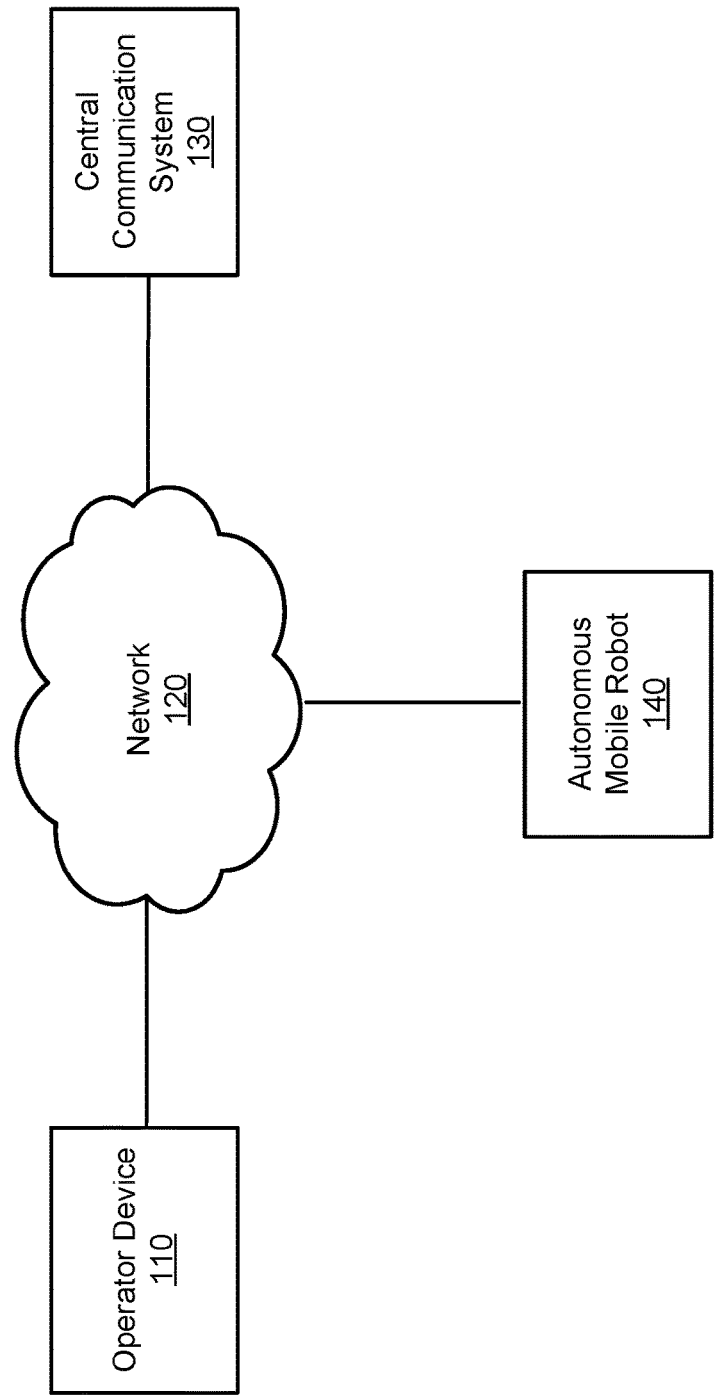
FIG. 1 illustrates an environment for operating an autonomous mobile robot using a central communication system, in accordance with some embodiments.

FIG. 1 illustrates an environment for operating an autonomous mobile robot using a central communication system, in accordance with some embodiments. Environment 100 includes operator device 110, network 120, central communication system 130, and autonomous mobile robot 140. Environment 100 may be generally described herein as a warehouse environment, however, environment 100 may be any kind of environment. Environment 100 need not be limited to a defined space (e.g., an interior of a warehouse), and may include any areas that are within the purview of instructions of an autonomous mobile robot (e.g., parking lots, loading docks, and so on that are outside of a warehouse space). While operator device 110 and central communication system 130 are depicted as being within environment 100, this is merely for convenience; these devices may be located outside of environment 100 (e.g., at a home, office, data center, cloud environment, etc.). Additional embodiments may include more, fewer, or different components from those illustrated in FIG. 1, and the functionality of each component may be divided between the components differently from the description below. Additionally, each component may perform their respective functionalities in response to a request from a human, or automatically without human intervention.

Operator device 110 may be any client device that interfaces one or more human operators with one or more autonomous mobile robots of environment 100 and/or central communication system 130. Exemplary client devices include smartphones, tablets, personal computers, kiosks, and so on. While only one operator device 110 is depicted, this is merely for convenience, and a human operator may use any number of operator devices to interface with autonomous mobile robots 140 or the central communication system 130. Operator device 110 may have a dedicated application installed thereon (e.g., downloaded from central communication system 130) for interfacing with the autonomous mobile robot 140 or the central communication system 130. Alternatively, or additionally, operator device 110 may access such an application by way of a browser. References to operator device 110 in the singular are done for convenience only, and equally apply to a plurality of operator devices.

Network 120 may be any network suitable for connecting operator device 110 with central communication system 130 and/or autonomous mobile robot 140. Exemplary networks may include a local area network, a wide area network, the Internet, an ad hoc network, and so on. In some embodiments, network 120 may be a closed network that is not connected to the Internet (e.g., to heighten security and prevent external parties from interacting with central communication system 130 and/or autonomous mobile robot 140). Such embodiments may be particularly advantageous where client device 110 is within the boundaries of environment 100.

Central communication system 130 acts as a central controller for a fleet of one or more robots including autonomous mobile robot 140. Central communication system 130 receives information from the fleet or the operator device 110 and uses that information to make decisions about activity to be performed by the fleet. Central communication system 130 may be installed on one device, or may be distributed across multiple devices. Central communication system 130 may be located within environment 100 or may be located outside of environment 100 (e.g., in a cloud implementation).

Autonomous mobile robot 140 may be any robot configured to act autonomously with respect to a command. For example, an autonomous mobile robot 140 may be commanded to move an object from a source area to a destination area, and may be configured to make decisions autonomously as to how to optimally perform this function (e.g., which side to lift the object from, which path to take, and so on). Autonomous mobile robot 140 may be any robot suitable for performing a commanded function. Exemplary autonomous mobile robots include vehicles, such as forklifts, mobile storage containers, etc. References to autonomous mobile robot 140 in the singular are made for convenience and are non-limiting; these references equally apply to scenarios including multiple autonomous mobile robots.

Exemplary Central Communication System Configuration

Figure 2:
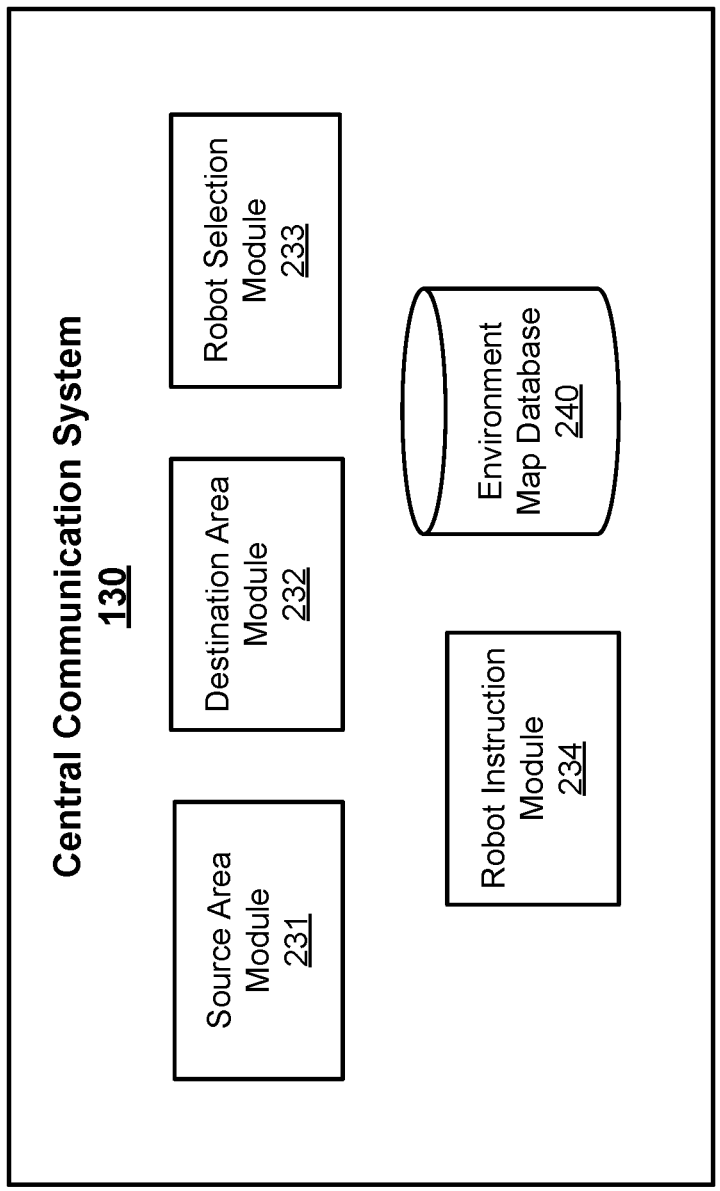
FIG. 2 illustrates exemplary modules and data stores used by a central communication system, in accordance with some embodiments.

FIG. 2 illustrates exemplary modules and data stores used by the central communication system 130, in accordance with some embodiments. The central communication system 130 may include a source area module 231, a destination area module 232, a robot selection module 233, and a robot instruction module 234, as well as an environment map database 240. The modules and databases depicted in FIG. 2 are merely exemplary; fewer or more modules and/or databases may be used by central communication system 130 to achieve the functionality disclosed herein. Additionally, the functionality of each component may be divided between the components differently from the description below. Additionally, each component may perform their respective functionalities in response to a request from a human, or automatically without human intervention.

The source area module 231 identifies a source area. The term source area, as used herein, may refer to either a single point, several points, or a region surrounded by a boundary (sometimes referred to herein as a source boundary) within which a robot is to manipulate objects (e.g., pick up objects for transfer to another area). In an embodiment, the source area module 231 receives input from operator device 110 that defines the point(s) and/or region that form the source area. In an embodiment, the source area module 231 may receive input from one or more robots (e.g., image and/or depth sensor information showing objects known to need to be moved (e.g., within a predefined load dock)), and may automatically determine a source area to include a region within a boundary that surrounds the detected objects. The source area may change dynamically as objects are manipulated (e.g., the source area module 232 may shrink the size of the source area by moving boundaries inward as objects are transported out of the source area, and/or may increase the size of the source area by moving boundaries outward as new objects are detected).

The destination area module 232 identifies a destination area. The term destination area, as used herein, may refer to either a single point, several points, or a region surrounded by a boundary (sometimes referred to herein as a destination boundary) within which a robot is to manipulate objects (e.g., drop an object off to rest). For example, where the objects are pallets in a warehouse setting, the destination area may include several pallet stands at different points in the facility, any of which may be used to drop off a pallet. The destination area module 232 may identify the destination area in any manner described above with respect to a source area, and may also identify the destination area using additional means.

The destination area module 232 may determine the destination area based on information about the source area and/or the objects to be transported. Objects in the source area may have certain associated rules that add constraints to the destination area. For example, there may be a requirement that the objects be placed in a space having a predefined property (e.g., a pallet must be placed on a pallet stand, and thus the destination area must have a pallet stand for each pallet to be moved). As another example, there may be a requirement that the objects be placed at least a threshold distance away from the destination area boundary, and thus, destination area module 232 may require a human draw the boundary at least at this distance and/or may populate the destination boundary automatically according to this rule (and thus, the boundary must be drawn at least that distance away). Yet further, destination area module 232 may require that the volume of the destination area is at least large enough to accommodate all of the objects to be transported that are initially within the source area.

Source area module 231 and destination area module 232 may, in addition to, or alternative to, using rules to determine their respective boundaries, may use machine learning models to determine their respective boundaries. The models may be trained to take information as input, such as some or all of the above-mentioned constraints, sensory data, map data, object detection data, and so on, and to output boundaries based thereon. The models may be trained using data on tasks assigned to robots in the past, such as data on how operators have defined or refined the tasks based on various parameters and constraints.

Robot selection module 233 selects one or more robots that are to transport objects from the source area to the destination area. In an embodiment, robot selection module 233 performs this selection based on one or more of a manipulation capability of the robots and a location of the robots within the facility. The term manipulation capability, as used herein, refers to a robot's ability to perform a task related to manipulation of an object. For example, if an object must be lifted, the robot must have the manipulation capability to lift objects, to lift an object having at least the weight of the given object to be lifted, and so on. Other manipulation capabilities may include an ability to push an object, an ability to drive an object (e.g., a mechanical arm may have an ability to lift an object, but may be unable to drive an object because it is affixed to, e.g., the ground), and so on. Further manipulation capabilities may include lifting and then transporting objects, hooking and then towing objects, tunneling and then transporting objects, using robots in combination with one another (e.g., an arm or other manipulates an object (e.g., lifts), places on another robot, and the robot then drives to the destination with the object). These examples are merely exemplary and non-exhaustive. Robot selection module 233 may determine required manipulation capabilities to manipulate the object(s) at issue, and may select one or more robots that satisfy those manipulation capabilities.

In terms of location, robot selection module 233 may select one or more robots based on their location to the source area and/or the destination area. For example, robot selection module 233 may determine one or more robots that are closest to the source area, and may select those robot(s) to manipulate the object(s) in the source area. Robot selection module 233 may select the robot(s) based on additional factors, such as a number of objects to be manipulated, manipulation capabilities of the robot (e.g., how many objects can the robot carry at once; sensors the robot is equipped with; etc.), motion capabilities of the robot, and so on. In an embodiment, robot selection module 233 may select robots based on a state of one or more robot's battery (e.g., a closer robot may be passed up for a further robot because the closer robot has insufficient battery to complete the task). In an embodiment, robot selection module 233 may select robots based on their internal health status (e.g., where a robot is reporting an internal temperature close to overheating, that robot may be passed up even if it otherwise optimal, to allow that robot to cool down). Other internal health status parameters may include battery or fuel levels, maintenance status, and so on. Yet further factors may include future orders, a scheduling strategy that incorporates a longer horizon window (e.g., a robot that is optimal to be used now may, if used now, result in inefficiencies (e.g., depleted battery level or sub-optimal location), given a future task for that robot), a scheduling strategy that incorporates external processes, a scheduling strategy that results from information exchanged between higher level systems (e.g., WMS, ERP, EMS, etc.), and so on.

The robot selection module 233 may select a robot using machine learning model trained to take various parameters as input, and to output one or more robots best suited to the task. The inputs may include available robots, their manipulation capabilities, their locations, their state of health, their availability, task parameters, scheduling parameters, map information, and/or any other mentioned attributes of robots and/or tasks. The outputs may include an identification of one or more robots to be used (or suitable to be used) to execute a task. The robot selection module 233 may automatically select one or more of the identified robots for executing a task, or may prompt a user of operator device 110 to select from the identified one or more robots.

The robot instruction module 234 transmits instructions to the selected one or more robots to manipulate the object(s) in the source area (e.g., to ultimately transport the object(s) to the destination area). In an embodiment, the robot instruction module 234 includes detailed step-by-step instructions on how to transport the objects. In another embodiment, the robot instruction module 234 transmits a general instruction to transmit one or more objects from the source area to the destination area, leaving the manner in which the objects will be manipulated and ultimately transmitted up to the robot to determine autonomously.

The robot instruction module 234 may transmit instructions to a robot to traverse from a start pose to an end pose. In some embodiments, the robot instruction module 234 simply transmits a start pose and end pose to the robot and the robot determines a path from the start pose to the end pose. Alternatively, the robot instruction module 234 may provide some information on a path the robot should take to travel from the start pose to the end pose. Robot pathfinding is discussed in more detail below.

Environment map database 240 stores information about the environment of the autonomous mobile robot 140. The environment of an autonomous mobile robot 140 is the area within which the autonomous mobile robot 140 operates. For example, the environment may be a facility or a parking lot within which the autonomous mobile robot 140 operates. In some embodiments, the environment map database 240 stores environment information in one or more maps representative of the environment. The maps may be two-dimensional, three dimensional, or a combination of both. Central communication facility 130 may receive a map from operator device 110, or may generate one based on input received from one or more robots 140 (e.g., by stitching together images and/or depth information received from the robots as they traverse the facility, and optionally stitching in semantic, instance, and/or other sensor-derived information into corresponding portions of the map). In some embodiments, the map stored by the environment map database 240 indicates the locations of obstacles within the environment. The map may include information about each obstacle, such as whether the obstacle is an animate or inanimate object.

Environment map database 240 may be updated by central communication facility 130 based on information received from the operator device 110 or from the robots 140. Information may include images, depth information, auxiliary information, semantic information, instance information, and any other information described herein. The environment information may include information about objects within the facility, obstacles within the facility, and auxiliary information describing activity in the facility. Auxiliary information may include traffic information (e.g., a rate at which humans and/or robots access a given path or area within the facility), information about the robots within the facility (e.g., manipulation capability, location, etc.), time-of-day information (e.g., traffic as it is expected during different segments of the day), and so on.

The central communication facility 130 may continuously update environment information stored by the environment map database 240 as such information is received (e.g., to show a change in traffic patterns on a given path). The central communication facility 130 may also update environment information responsive to input received from the operator device 110 (e.g., manually inputting an indication of a change in traffic pattern, an area where humans and/or robots are prohibited, an indication of a new obstacle, and so on).

Exemplary Autonomous Mobile Robot Configuration

Figure 3:
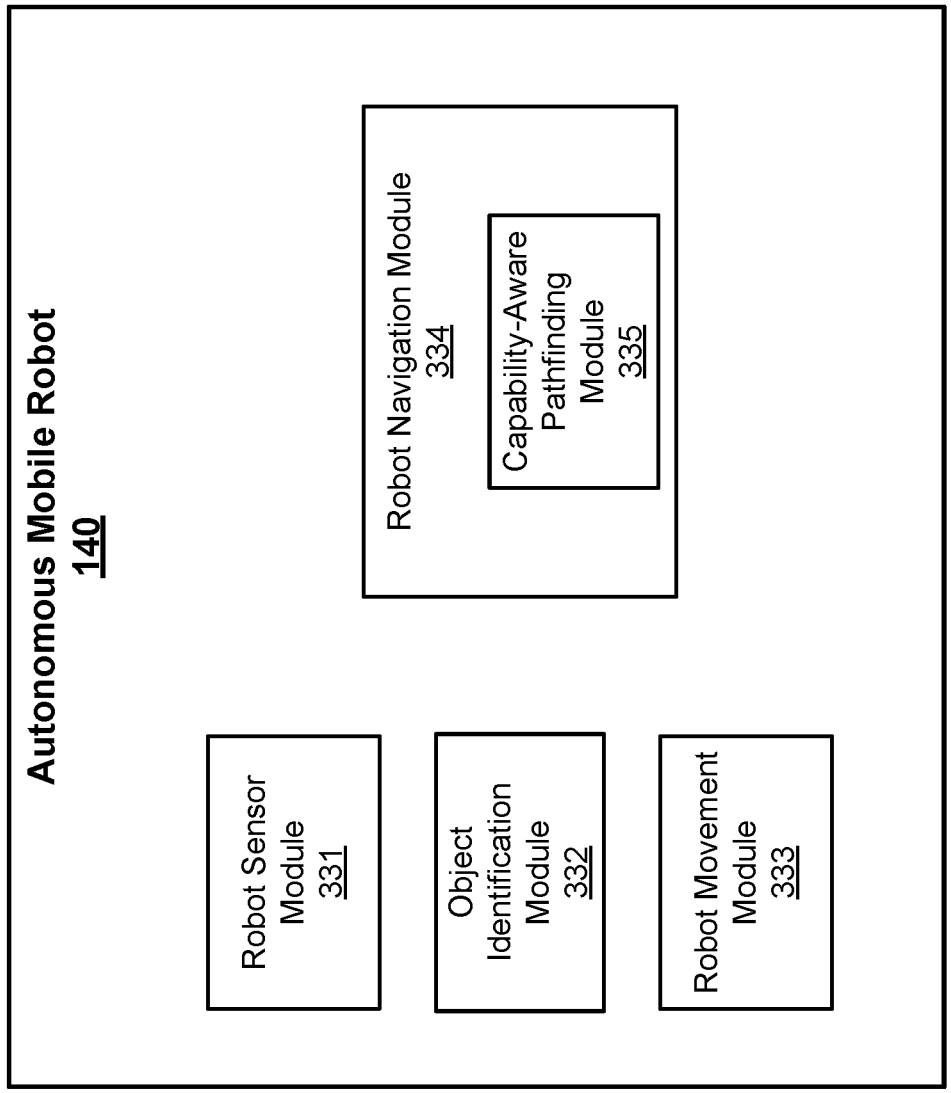
FIG. 3 illustrates exemplary modules and data stores used by the autonomous mobile robot, in accordance with some embodiments.

FIG. 3 illustrates exemplary modules and data stores used by the autonomous mobile robot, in accordance with some embodiments. As depicted in FIG. 3, autonomous mobile robot 140 includes a robot sensor module 331, an object identification module 332, a robot movement module 337, and a robot navigation module 334. The modules and databases depicted in FIG. 3 are merely exemplary; fewer or more modules and/or databases may be used to achieve the functionality described herein. Furthermore, any of the described functionality of the modules may instead be performed by the central communication system 130 or the operator device 110. Additionally, any of the functionality of these modules may be performed with or without human instruction.

The robot sensor module 331 includes a number of sensors that the robot uses to collect data about the robot's surroundings. For example, the robot sensor module 331 may include one or more cameras, one or more depth sensors, one or more scan sensors (e.g., RFID), a location sensor (e.g., showing location of the robot within the facility and/or GPS coordinates), and so on. Additionally, the robot sensor module 331 may include software elements for preprocessing sensor data for use by the robot. For example, the robot sensor module 331 may generate depth data information based on LIDAR sensor data. Data collected by the robot sensor module 331 may be used by the object identification module 332 to identify obstacles around the robot or may be used to determine a pose into which the robot must travel to reach an end pose.

The object identification module 332 ingests information received from the robot sensor module 331, and outputs information that identifies an object in proximity to the robot. The object identification module 332 may utilize information from a map of the facility (e.g., as retrieved from environment map database 240) in addition to information from the robot sensor module 331 in identifying the object. For example, the object identification module 332 may utilize location information, semantic information, instance information, and so on to identify the object.

Additionally, the object identification module 332 identifies obstacles around the robot for the robot to avoid. For example, the object identification module 332 determines whether an obstacle is an inanimate obstacle (e.g., a box, a plant, or a column) or an animate object (e.g., a person or an animal). The object identification module 332 may use information from the environment map database 240 to determine where obstacles are within the robot's environment. Similarly, the object identification module 332 may use information from the robot sensor module 331 to identify obstacles around the robot.

The robot movement module 333 transports the robot within its environment. For example, the robot movement module 333 may include a motor, wheels, tracks, and/or legs for moving. The robot movement module 333 may include components that the robot uses to move from one pose to another pose. For example, the robot may use components in the robot movement module 333 to change its x-, y-, or z-coordinates or to change its orientation. In some embodiments, the robot movement module 333 receives instructions from the robot navigation module 334 to follow a path determined by the robot navigation module 334 and performs the necessary actions to transport the robot along the determined path.

The robot navigation module 334 determines a path for the robot from a start pose to an end pose within the environment. A pose of the robot may refer to an orientation of the robot and/or a location of the robot (including x-, y-, and z-coordinates). The start pose may be the robot's current pose or some other pose within the environment. The end pose may be an ultimate pose within the environment to which the robot is traveling or may be an intermediate pose between the ultimate pose and the start pose. The path may include a series of instructions for the robot to perform to reach the goal pose. For example, the path may include instructions for the robot to travel from one x-, y-, or z-coordinate to another and/or to adjust the robot's orientation (e.g., by taking a turn or by rotating in place). In some embodiments, the robot navigation module 334 implements routing instructions received by the robot from the central communication system 130. For example, the central communication system 130 may transmit an end pose to the robot navigation module 334 or a general path for the robot to take to a goal pose, and the robot navigation module 334 may determine a path that avoids objects, obstacles, or people within the environment. The robot navigation module 334 may determine a path for the robot based on sensor data or based on environment data. In some embodiments, the robot navigation module 334 updates an already determined path based on new data received by the robot.

In some embodiments, the robot navigation module 334 receives an end location and the robot navigation module 334 determines an orientation of the robot necessary to perform a task at the end location. For example, the robot may receive an end location and an instruction to deliver an object at the end location, and the robot navigation module 334 may determine an orientation that the robot must take to properly deliver the object at the end location. The robot navigation module 334 may determine a necessary orientation at the end location based on information captured by the robot sensor module 331, information stored by the environment map database 240, or based on instructions received from an operator device. In some embodiments, the robot navigation module 334 uses the end location and the determined orientation at the end location to determine the end pose for the robot.

In some embodiments, the robot navigation module 334 includes a capability-aware pathfinding module 335. The capability-aware pathfinding module 335 generates a path for the robot navigation module 334 from a start pose to an end pose based on the motion capabilities of the robot. As used herein, the robot's motion capabilities are the movements that the robot is capable of making. For example, the robot's motion capabilities may include a forward movement, a backward movement, a turn with a minimum turning radius, rotation in place, or a movement speed. To generate a path, the capability-aware pathfinding module 335 generates a primary path, based on a primary pathfinding algorithm, to be used by the robot to navigate from a start pose to an end pose. However, if a conflict point arises along the primary path (e.g., because the robot cannot rotate in place to achieve a necessary orientation at the start or end pose or because the robot cannot turn with a sufficiently narrow turning radius to avoid an obstacle), the capability-aware pathfinding module 335 may generate a secondary path based on a more-computationally expensive secondary pathfinding algorithm which accounts for the motion capabilities of the robot in determining the secondary path. The capability-aware pathfinding module 335 may modify the primary path based on the secondary path such that the robot can follow the secondary path to merge onto the primary path at a point after the conflict point.

As noted above, the capability-aware pathfinding module 335 may use the secondary pathfinding algorithm modifying segments of the primary path with conflict points. Since the secondary pathfinding algorithm accounts for the motion capabilities of the robot, the capability-aware pathfinding module 335 generates a path that the robot can follow from the start pose to the end pose without colliding with an obstacle. Furthermore, since the secondary pathfinding algorithm may be more computationally expensive than the primary pathfinding algorithm, the capability-aware pathfinding module 335 may use the primary pathfinding algorithm to generate the majority of the path, with the secondary pathfinding algorithm only being applied in limited circumstances. Thus, the capability-aware pathfinding module 335 does not need to use the more-computationally expensive secondary pathfinding algorithm to generate the entire path, and therefore can generate the path overall much more efficiently. The capability-aware pathfinding module 335 is discussed in further detail below.

Exemplary Capability-Aware Pathfinding Module

Figure 4:
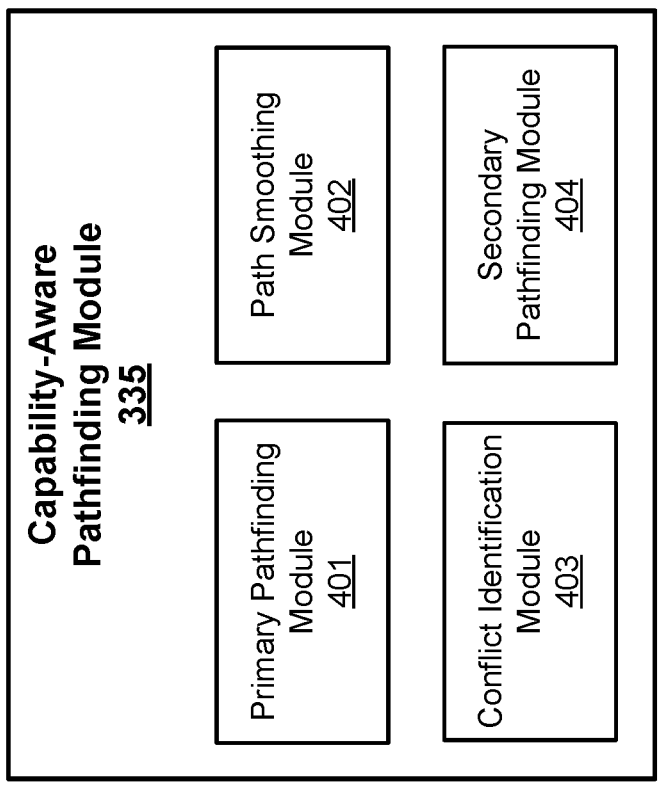
FIG. 4 illustrates an example capability-aware pathfinding module, in accordance with some embodiments.

FIG. 4 illustrates an example capability-aware pathfinding module 335, in accordance with some embodiments. The illustrated capability-aware pathfinding module 335 includes a primary pathfinding module 401, a path smoothing module 402, a conflict identification module 403, and a secondary pathfinding module 404. Additional embodiments may include more, fewer, or different components from those illustrated in FIG. 4, and the functionality of each component may be divided between the components differently from the description below. Additionally, each component may perform their respective functionalities in response to a request from a human, or automatically without human intervention. Furthermore, while the description herein of the capability-aware pathfinding module 335 may be described such that the robot is performing all steps, some or all of the steps described herein may instead be performed by a central communication system or an operator device.

The primary pathfinding module 401 generates a primary path from a start pose to an end pose. The primary pathfinding module 401 receives a start pose and an end pose for a path that the robot will take. The primary pathfinding module 401 may receive the start pose by determining the robot's current position and orientation within the environment or may receive the start pose from the central communication system or the operator device. Similarly, the primary pathfinding module 401 may receive the end pose for the path from the central communication system or the operator device. In some embodiments, the start and end poses are poses within the robot's environment.

The primary pathfinding module 401 may also receive environment data describing the robot's environment. The primary pathfinding module 401 may receive environment data via sensors on the robot, from a central communication system, and/or an operator device. The environment data may include a map of the robot's environment (e.g., a map stored by the environment map database 240) describing areas where the robot can travel safely and where the robot may face obstacles. For example, the environment data may designate where obstacles are positioned within the environment and may designate all other areas in the environment as safe for the robot to traverse.

The primary pathfinding module 401 generates a primary path from the start pose to the end pose using a primary pathfinding algorithm. In some embodiments, the primary pathfinding algorithm applies a path search algorithm (such as the A* search algorithm) to generate the primary path. Additionally, the primary pathfinding algorithm may apply a machine-learning model (such as a neural network) to generate the primary path. In some embodiments, the primary pathfinding algorithm may assign costs to coordinates within the environment. These costs may be based on the proximity of the coordinates to obstacles. For example, the cost of traveling to a coordinate within the environment may increase as the coordinate is closer to an obstacle. In some embodiments, the cost may be proportional to the distance of the coordinate to the nearest obstacle. Additionally, the primary pathfinding algorithm may apply a heuristic to generate the primary path. In some embodiments, the primary pathfinding algorithm applies the Euclidean distance or a cost gradient as a heuristic to generate the primary path.

The primary pathfinding module 401 applies the primary pathfinding algorithm to generate a primary path through the environment. To generate the primary path, the primary pathfinding module 401 may generate subsections of the environment over which the primary pathfinding module 401 applies the primary pathfinding algorithm. These subsections of the environment may include a subset of coordinates within the environment and/or regions within the environment. In some embodiments, the subsections include a fixed-size grid of regions within the environment. The primary pathfinding module 401 may generate the subsections based on the pose of the robot, the locations of objects within the environment, and/or the locations of obstacles within the environment.

Figure 5:
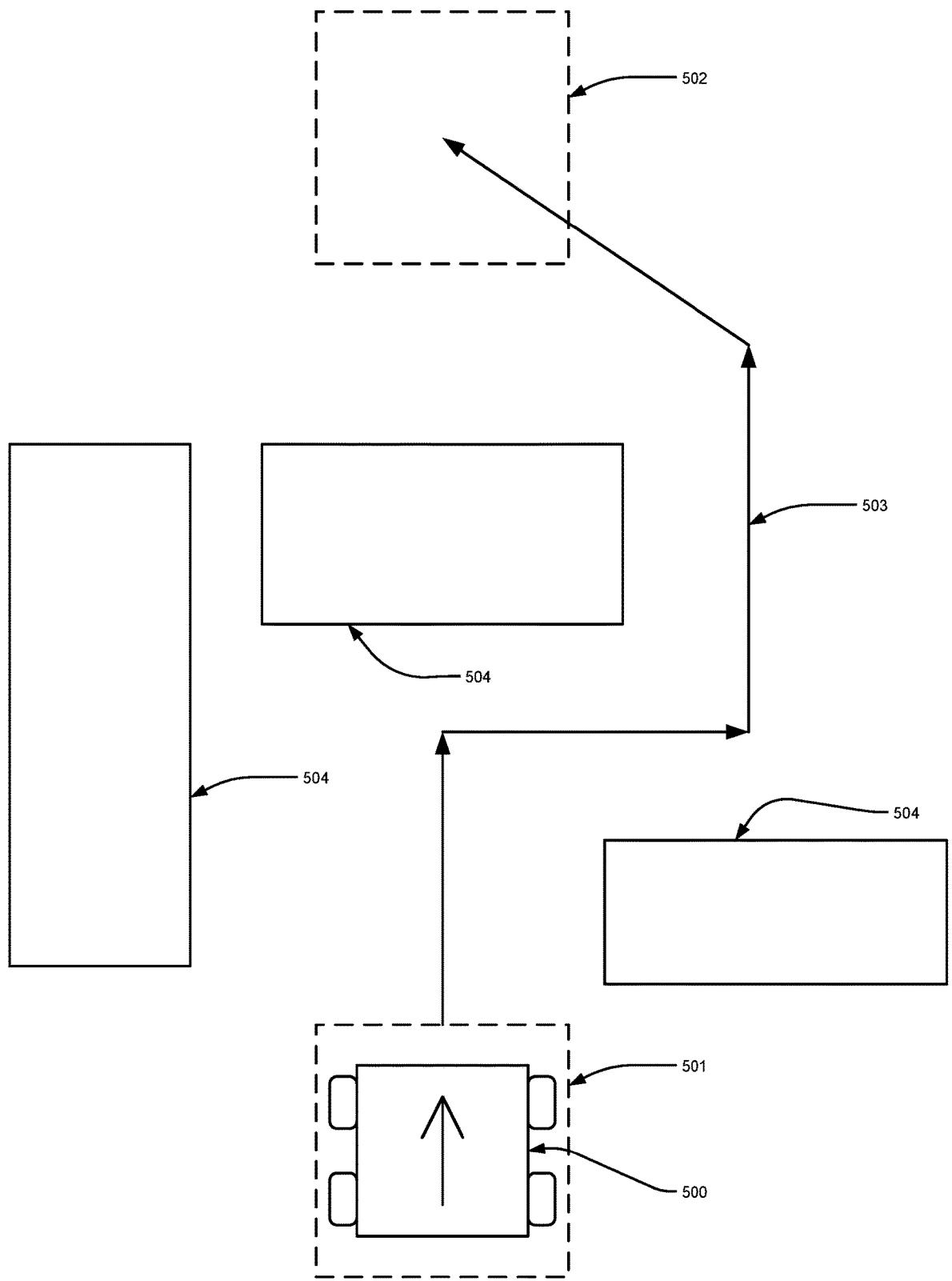
FIG. 5 illustrates an exemplary primary path generated by the primary pathfinding module, in accordance with some embodiments.

FIG. 5 illustrates an exemplary primary path generated by the primary pathfinding module 401, in accordance with some embodiments. The robot 500 has a start pose 501 and an end pose 502. The robot 500 generates a primary path 503 from the start pose 501 to the end pose 502 that avoids the obstacles 504.

The path smoothing module 402 applies a smoothing algorithm to the primary path generated by the primary pathfinding module 401. For example, the path smoothing module 402 may smooth the primary path by modifying the primary path based on Bezier curves of different segments along the primary path. The smoothing algorithm applied by the robot may smooth the primary path while still avoiding obstacles within the environment.

Figure 6:
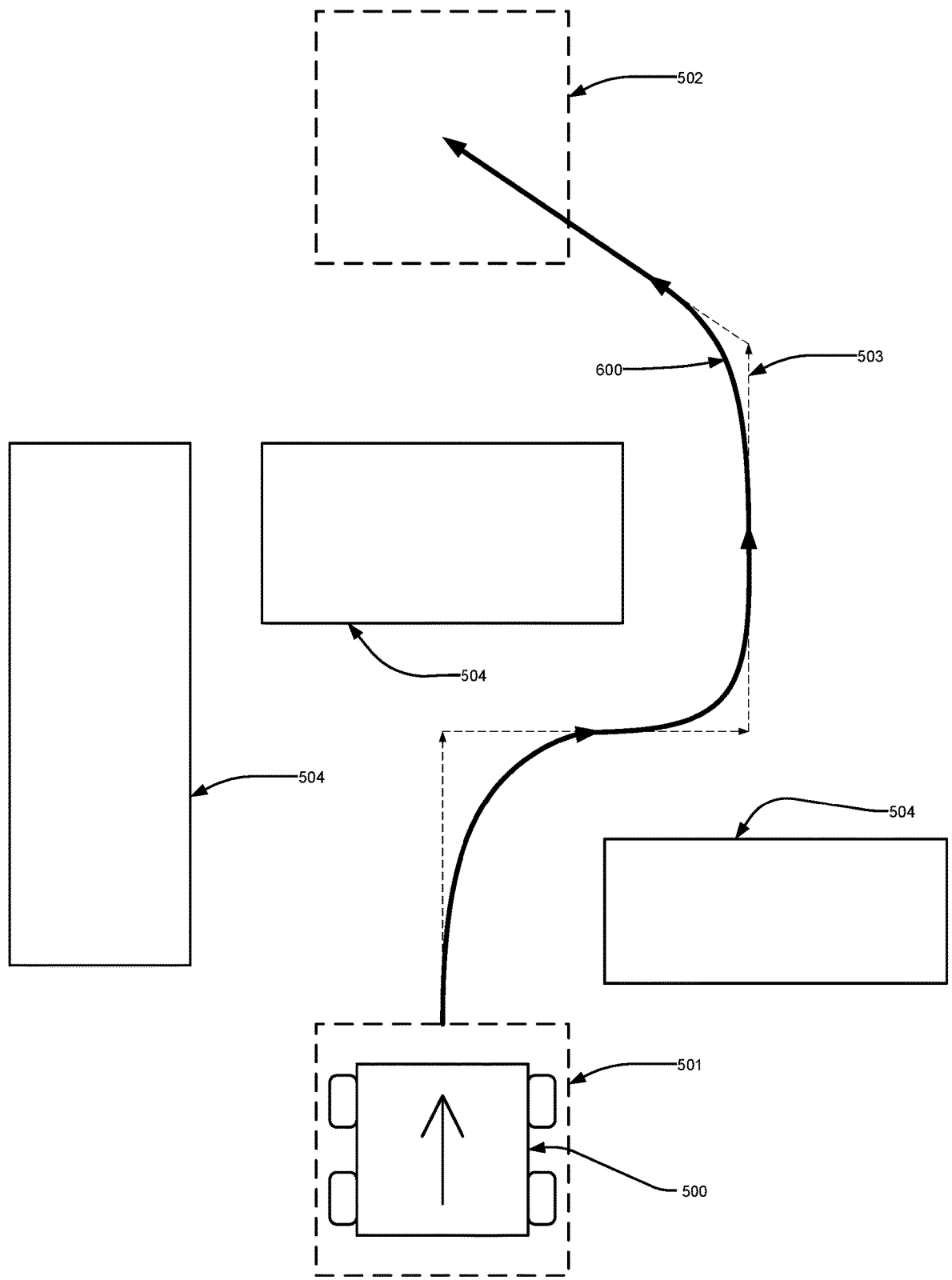
FIG. 6 illustrates an exemplary smoothed primary path after the path smoothing module smooths a primary path generated by the primary pathfinding module, in accordance with some embodiments.

FIG. 6 illustrates an exemplary smoothed primary path 600 after the path smoothing module 402 smooths a primary path 503 generated by the primary pathfinding module 401, in accordance with some embodiments.

In some embodiments, the path smoothing module 402 applies a recursive process to smooth the primary path while avoiding obstacles. For example, the path smoothing module 402 may identify a set of segments along the primary path and generate a Bezier curve for each of the segments. The set of segments may be fixed-length segments along the primary path, or may vary in length (e.g., based on the contours of the primary path, objects or obstacles near the path, etc.). In some embodiments, the length of each segment is a predetermined length. The path smoothing module 402 may generate a Bezier curve with an initial number of control points. For example, the path smoothing module 402 may generate a quadratic Bezier curve for each segment using three control points on each segment of the primary path. In some embodiments, the path smoothing module 402 uses a control point at the start and end of each segment to generate a Bezier curve for each segment.

The path smoothing module 402 may determine whether the Bezier curve generated for a segment would cause the robot to collide with, or come within a threshold distance of, an obstacle while following Bezier curve. In some embodiments, the threshold distance is dependent on a type of the obstacle (e.g., whether the obstacle is a human or an inanimate object). Responsive to the path smoothing module 402 determining that the robot would collide with, or come within a threshold distance of, an obstacle, the path smoothing module 402 may add an additional control point on the segment between the two control points between which the collision would occur. The path smoothing module 402 may generate the additional control point based on an area around a midpoint between the two control points. For example, the path smoothing module 402 may consider an area around the midpoint that is prespecified or that is dependent on the locations of the two original control points. In some embodiments, the path smoothing module 402 identifies a point within the area that is a maximum distance from a nearest obstacle and selects that point as the additional control point.

The path smoothing module 402 may then generate a new Bezier curve of a higher order than the original Bezier curve based on the original control points and the additional control point. If the higher order Bezier curve also collides with an obstacle, then the path smoothing module 402 continues until the smoothing algorithm identifies Bezier curve that avoids the obstacle.

FIG. 7A-B illustrates an exemplary process by which new control points are added to generate smoothed segment of a primary path, in accordance with some embodiments. In FIG. 7A, the smoothed primary path 700 has been generated based on the original primary path 701. The illustrated segment of the smoothed primary path 700 has been generated based on the four control points 702. However, the smoothed primary path 700 created based on these control points 702 collides 703 with an obstacle. In FIG. 7B, an additional control point 705 is added and a new smoothed primary path 706 is generated based on the new control point. The additional control point 705 may be selected based on an area around a midpoint between two other control points 702, and may be selected to maximize a distance from obstacles 704.

The conflict identification module 403 identifies conflict points on the primary path. The conflict identification module 403 may identify conflict points on a primary path directly generated by a primary pathfinding module 401 or a primary path that has been smoothed by the path smoothing module 402. Conflict points are points, poses, places, or segments on the primary path through which the robot is not capable of traversing given the robot's motion capabilities. For example, the primary path may include a conflict point at locations where the primary path assumes that the robot can rotate in place, but the robot is incapable of doing so. In some embodiments, the primary path may include a conflict point at the start pose or the end pose because the start pose or end pose requires the robot to start or end in an orientation that the robot is incapable of achieving. For example, the primary path may require the robot to rotate in place to enter the primary path from the start pose, or may require the robot to rotate in place to achieve a correct orientation for the end pose.

The capability-aware pathfinding module 335 may modify the primary path at conflict points so that the robot can traverse along the primary path to the end pose. To modify the primary path, the conflict identification module 403 may identify a first point on the primary path that comes before the conflict point and a second point on the path that comes after the conflict point. In some embodiments, the first point and second point must be some minimum or maximum distance away from the conflict point. Additionally, the first point or second point may overlap with the conflict point, the start pose, or the end pose. For example, the first point may be the start pose where the robot cannot achieve a rotation required by the primary path or the second point may be the end pose where the end pose includes an orientation that the robot cannot achieve. The first point may be the current location of the robot (e.g., where the conflict point is at the start pose) or may be some point along the primary path between the robot's current position and the conflict point. In some embodiments, the conflict identification module 403 selects a second point based on the contours of the primary path. For example, the conflict identification module 403 may select a second point on a relatively straight portion of the primary path to make it easier for the robot to merge from a secondary path to the primary path.

Figure 8A:
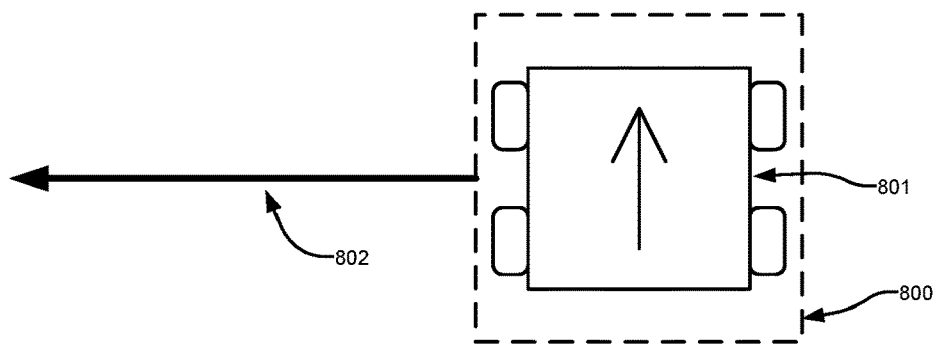
FIG. 8A-C illustrates example conflicts that may arise based on a primary path, in accordance with some embodiments.
Figure 8B:
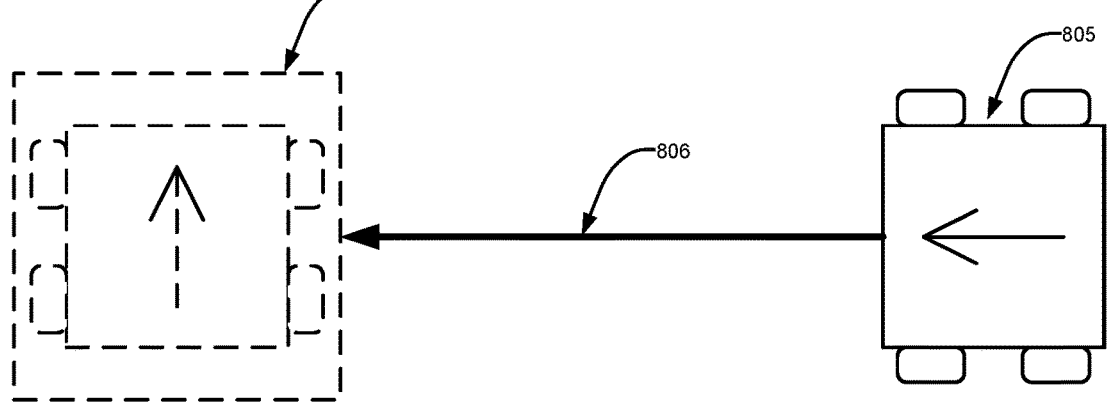
Figure 8C:
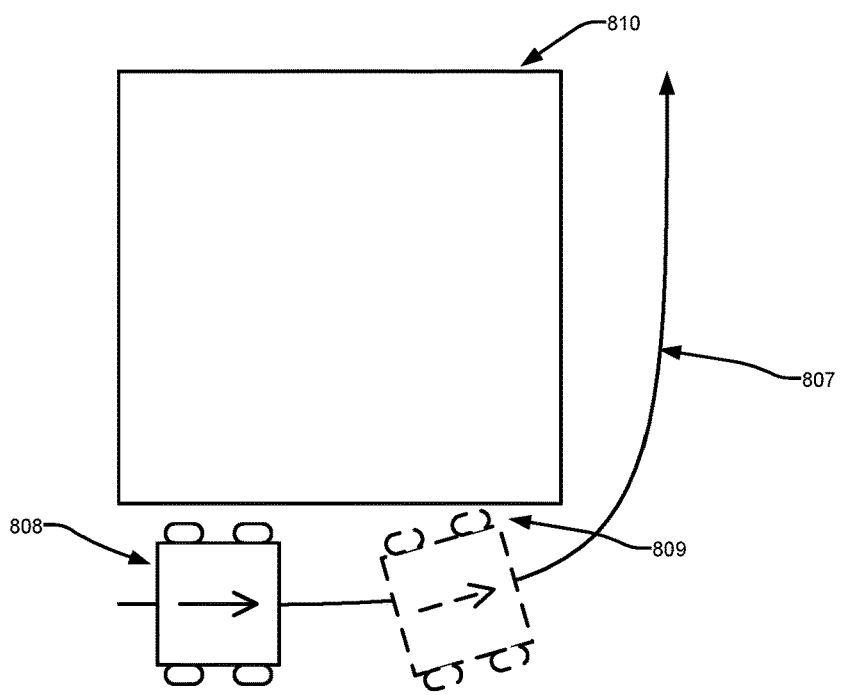

FIG. 8A-C illustrates example conflicts that may arise based on a primary path, in accordance with some embodiments. In these embodiments, the robot cannot rotate in place. FIG. 8A illustrates a conflict that has arisen at the start pose 800. The robot 801 cannot follow primary path 802 because the robot 801 is not capable of rotating in place to travel in the required direction. FIG. 8B illustrates a conflict that has arisen at the end pose 804. If the robot 805 cannot rotate in place, then the robot 805 cannot reach the end post 804 because the robot 805 cannot rotate to achieve the required upward orientation. FIG. 8C illustrates a conflict that has arisen along the primary path 807 between the start pose and the end pose. Here, the turning radius of the robot 808 is not sufficiently narrow to follow the primary path 807 without colliding 809 with the obstacle 810.

The secondary pathfinding module 404 applies a secondary pathfinding algorithm for the robot to travel from the first point identified by the conflict identification module 403 to the second point identified by the conflict identification module 403. The secondary pathfinding algorithm is a pathfinding algorithm that can generate a secondary path from the first point to the second point while accounting for the motion capabilities of the robot. In some embodiments, the secondary pathfinding algorithm is more computationally expensive than the primary pathfinding algorithm. The secondary pathfinding algorithm may use motion primitives to generate a secondary path from the first point to the second point. Motion primitives are basic units of motion which the robot is capable of performing. The secondary pathfinding algorithm may perform a search over the possible motion primitives that the robot is capable of performing to determine a series of motion primitives that would result in the robot traveling from the first point to the second point. The secondary pathfinding algorithm may additionally assign costs to coordinates within the environment based on proximity to obstacles. For example, the secondary pathfinding algorithm may assign a higher cost to a coordinate that is closer to an obstacle than a coordinate that is further from an obstacle. In some embodiments, the secondary pathfinding algorithm assigns a cost to a coordinate that is directly proportional to the distance of the coordinate to the nearest obstacle.

Figure 9A:
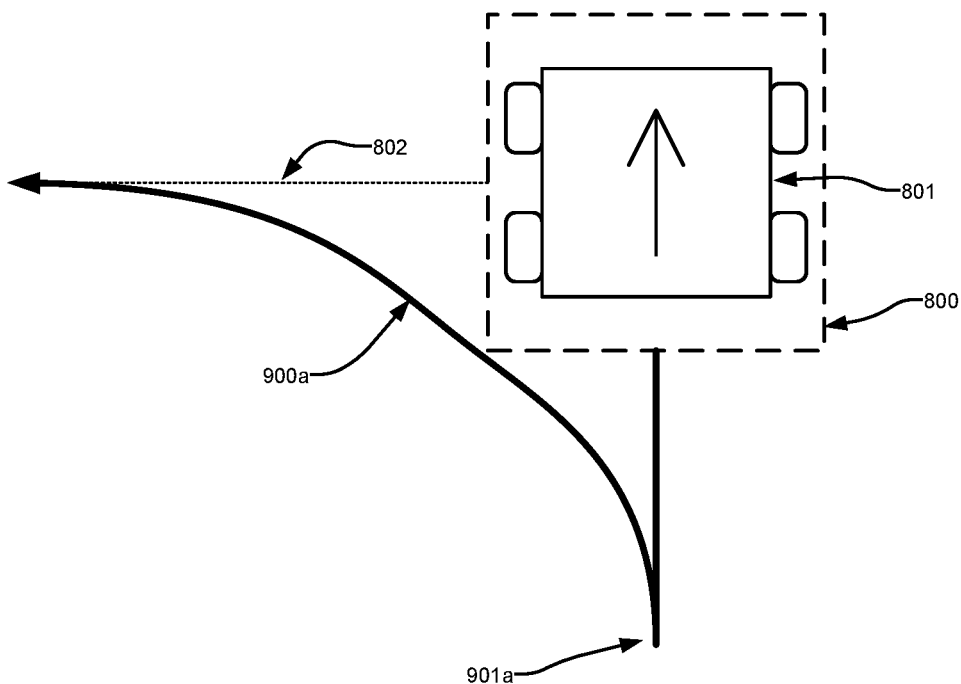
FIG. 9A-C illustrate example secondary paths generated to avoid the conflicts identified in FIG. 8A-C, in accordance with some embodiments.
Figure 9B:
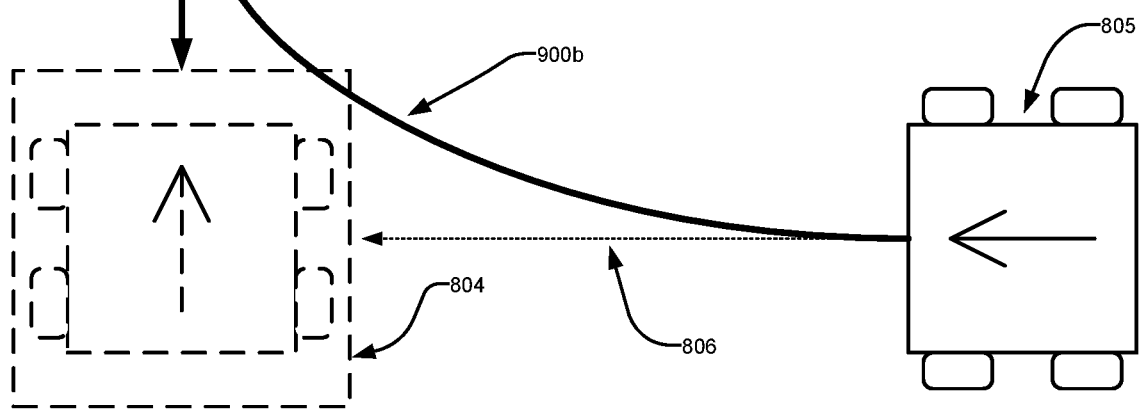
Figure 9C:
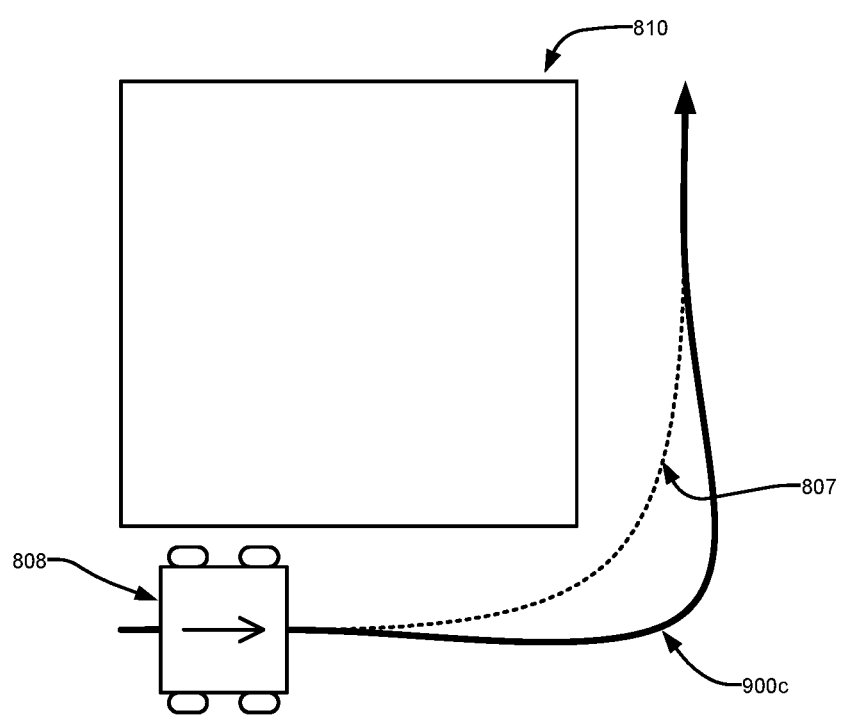

FIG. 9A-C illustrate example secondary paths 900 generated to avoid the conflicts identified in FIG. 8A-C, in accordance with some embodiments. The secondary paths 900 are generated such that the robot, in following the secondary paths 900, eventually merges onto the primary path.

In FIG. 9A, the robot 801 travels along a secondary path 900a that causes the robot to travel in reverse from the start pose 800 to a location 910a near the robot's starting pose 800. The robot follows a curved portion of the secondary path 900a that does not require a turning radius in excess of the robot's motion capabilities.

In FIG. 9B, the robot 805 travels along the primary path 806 until the robot reaches the first point of the secondary path 900b. The robot 805 travels along a curved portion of the secondary path 900b to a location 901b near the robot's end pose 804. The robot 805 then travels in reverse to the end pose 804.

In FIG. 9C, the robot 808 travels along the primary path 807 until the first point of the secondary path 900c. The robot 808 travels along the secondary path 900c, which has a broader turning radius than the primary path 807, thereby avoiding a collision with the obstacle 810.

The robot may follow the secondary path until the robot reaches the second point. The robot may then transition from the path generated by the secondary pathfinding algorithm to the primary path at the second point. In some embodiments, the robot modifies the primary path based on the path generated by the secondary pathfinding algorithm and the robot follows the modified primary path from the start pose to the end pose.

Figure 10:
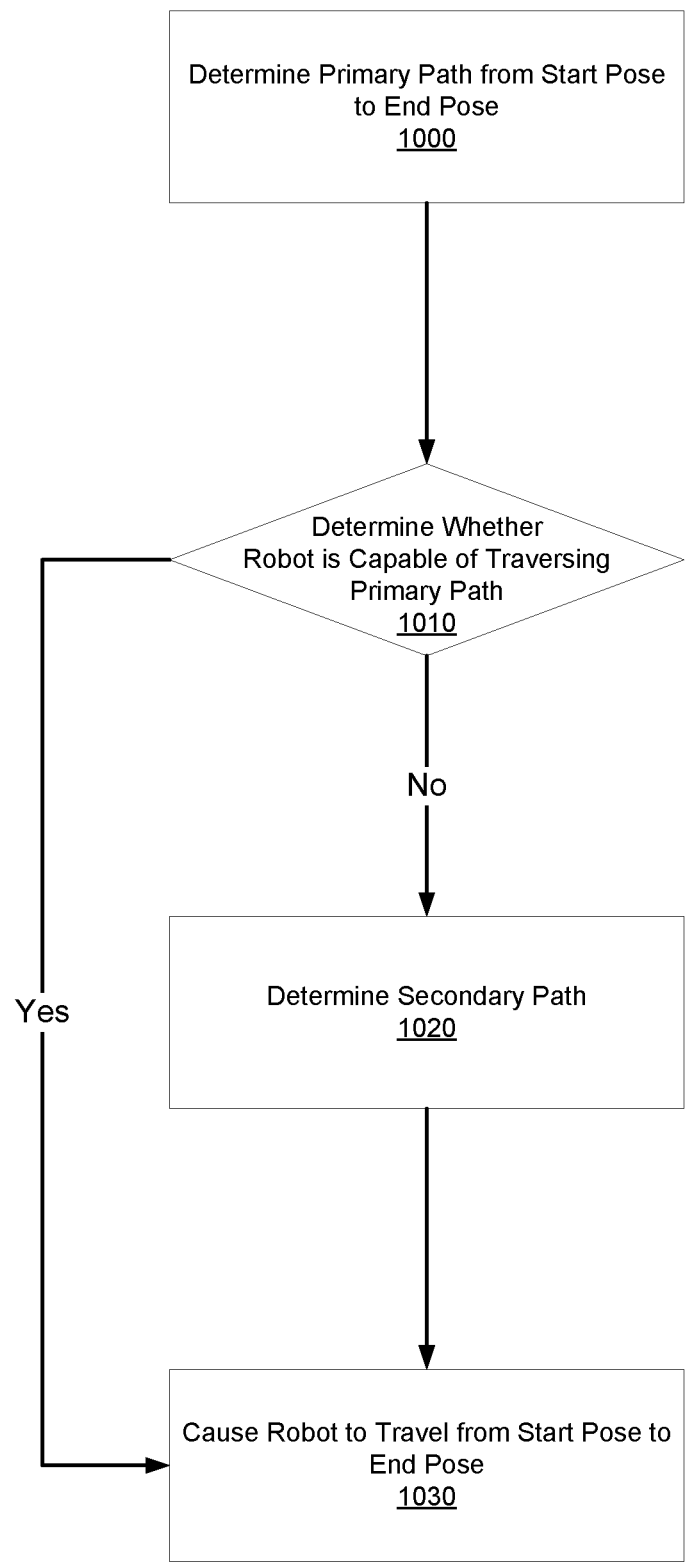
FIG. 10 is a flowchart illustrating an example method for using a capability-aware pathfinding algorithm to navigate an autonomous mobile robot, in accordance with some embodiments.

FIG. 10 is a flowchart illustrating an example method for using a capability-aware pathfinding algorithm to navigate an autonomous mobile robot, in accordance with some embodiments. The method illustrated by FIG. 10 may include more, fewer, or different steps from those illustrated by FIG. 10, and may be performed in a different order from that illustrated in FIG. 10. Additionally, the steps may be performed automatically or in response to an instruction from a human. Furthermore, while the method illustrated by FIG. 10 is described as being performed by the robot, any of the steps of the described method may be performed by any of the autonomous mobile robot, the central communication system, and/or the operator device.

The robot determines 1000 a primary path from a start pose to an end pose. The robot may receive the start pose from a central communication system or may determine a start pose based on the current location of the robot. Additionally, the robot may receive an end pose from the central communication system or from an operator device.

The robot may determine the primary path by generating a primary path using a primary pathfinding algorithm. The primary pathfinding algorithm may use a path search algorithm (e.g., the A* search algorithm) and/or a machine learning model (e.g., a neural network) to generate the primary path. In some embodiments, the robot determines the primary path such that the primary path is optimized based on obstacles within the robot's environment. For example, when applying a primary pathfinding algorithm, the robot may assign costs to coordinates in the robot's environment based on the proximity of the coordinates to obstacles.

In some embodiments, the robot applies a smoothing algorithm to the primary path generated by the primary pathfinding algorithm. For example, the robot may use Bezier curves to smooth the primary path. The robot may smooth the primary path such that the primary path avoids obstacles within the environment. For example, the robot may apply a recursive process by which the robot adds control points to segments of the primary path that collide with obstacles.

The robot determines 1010 whether it is capable of traversing the primary path. For example, the robot may determine whether it is capable of traversing the primary path based on the motion capabilities of the robot. In some embodiments, the robot identifies conflict points on the primary path to determine whether the robot is capable of traversing the primary path. For example, the robot may identify conflict points at points on the primary path where the primary path assumes the robot can rotate in place (e.g., rotate in place at the start pose or the end pose). Similarly, the robot may identify conflict points at points where the primary path assumes that the robot has a narrower turning radius than the robot has.

Responsive to the robot determining 1010 that it is capable of traversing the primary path, the robot causes 1030 itself to travel from the start pose to the end pose along the primary path. Responsive to the robot determining 1010 that it is not capable of traversing the primary path, the robot determines 1020 a secondary path from a first point on the primary path to a second point on the primary path. The first point on the primary path may be a point on the primary path before an identified conflict point and the second point may be a point on the primary path after the identified conflict point. In some embodiments, the first point and/or the second point overlap with an identified conflict point, the start pose, and/or the end pose. For example, the first point may be the start pose where the robot cannot achieve a rotation required by the primary path or the second point may be the end pose where the end pose includes an orientation that the robot cannot achieve. In some embodiments, the robot selects the second point based on the contours of the primary path. For example, the robot may select a second point on a relatively straight portion of the primary path.

The robot may determine 1020 the secondary path such that the secondary path is optimized based on obstacles, the motion capabilities of the robot, and the contours of the primary path. For example, the robot may apply a secondary pathfinding algorithm that accounts for the motion capabilities of the robot. For example, the secondary pathfinding algorithm may use motion primitives to generate the secondary path. In some embodiments, the secondary pathfinding algorithm is more computationally expensive than the primary pathfinding algorithm.

Computing Machine Architecture

Figure 11:
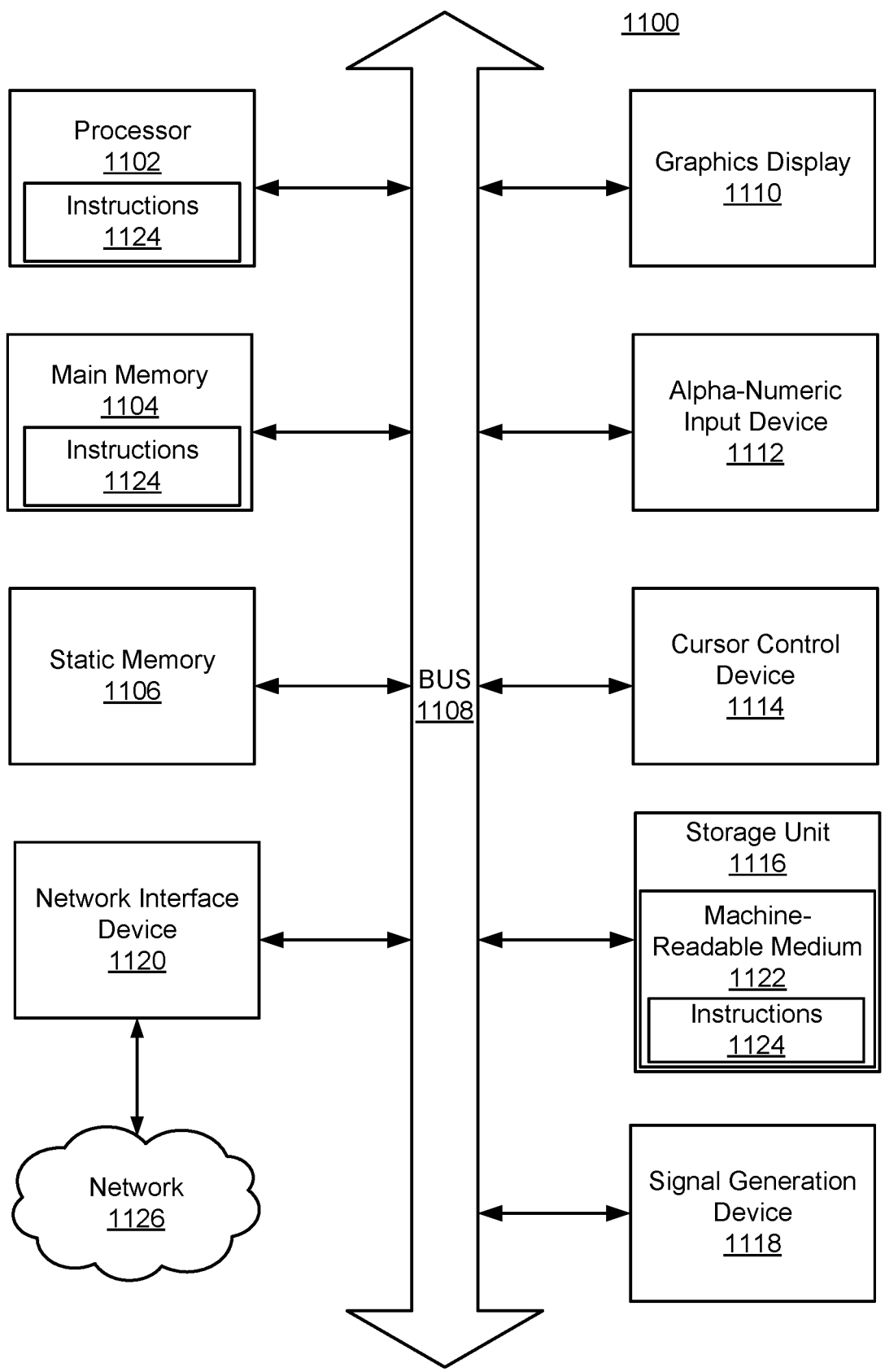
FIG. 11 is a block diagram illustrating components of an example machine able to read instructions from a machine-readable medium and execute them in a processor (or controller), in accordance with some embodiments.

FIG. 11 is a block diagram illustrating components of an example machine able to read instructions from a machine-readable medium and execute them in a processor (or controller), in accordance with some embodiments. Specifically, FIG. 11 shows a diagrammatic representation of a machine in the example form of a computer system 1100 within which program code (e.g., software) for causing the machine to perform any one or more of the methodologies discussed herein may be executed. In some embodiments, FIG. 11 illustrates an example machine capable of executing the processes described herein, such as the method illustrated by FIG. 10, or the functionalities of modules described above, such as the autonomous mobile robot 140 and the central communication system 130.

The program code may be comprised of instructions 1124 executable by one or more processors 1102. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1124 (sequential or otherwise) that specify actions to be taken by that machine. Further, while only a single machine is illustrated, the term "machine" shall also be taken to include any collection of machines that individually or jointly execute instructions 1124 to perform any one or more of the methodologies discussed herein.

The example computer system 1100 includes a processor 1102 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1104, and a static memory 1106, which are configured to communicate with each other via a bus 1108. The computer system 1100 may further include visual display interface 1110. The visual interface may include a software driver that enables displaying user interfaces on a screen (or display). The visual interface may display user interfaces directly (e.g., on the screen) or indirectly on a surface, window, or the like (e.g., via a visual projection unit). For ease of discussion the visual interface may be described as a screen. The visual interface 1110 may include or may interface with a touch enabled screen. The computer system 1100 may also include alpha-numeric input device 1112 (e.g., a keyboard or touch screen keyboard), a cursor control device 1114 (e.g., a mouse, a trackball, a joystick, a motion sensor, or other pointing instrument), a storage unit 1116, a signal generation device 1118 (e.g., a speaker), and a network interface device 1120, which also are configured to communicate via the bus 1108.

The storage unit 1116 includes a machine-readable medium 1122 on which is stored instructions 1124 (e.g., software) embodying any one or more of the methodologies or functions described herein. The instructions 1124 (e.g., software) may also reside, completely or at least partially, within the main memory 1104 or within the processor 1102 (e.g., within a processor's cache memory) during execution thereof by the computer system 1100, the main memory 1104 and the processor 1102 also constituting machine-readable media. The instructions 1124 (e.g., software) may be transmitted or received over a network 1126 via the network interface device 1120.

While machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., instructions 1124) for execution by the machine and that cause the machine to perform any one or more of the methodologies disclosed herein. The term "machine-readable medium" includes, but not be limited to, data repositories in the form of solid-state memories, optical media, and magnetic media.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a system and a process for operating autonomous mobile robots in a facility through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition A or B is satisfied by any one of the following: A is true (or present) and B is false (or not present), A is false (or not present) and B is true (or present), and both A and B are true (or present).

What is claimed is:

1. A method comprising:
    determining, for an autonomous mobile robot at a start pose, a primary path to an end pose of an environment, the primary path optimized based on obstacles within the environment, wherein determining the primary path comprises:
        generating a primary path from the start pose to the end pose, wherein the primary path comprises a plurality of segments of the primary path; and
        applying a smoothing algorithm to each segment of the plurality of segments of the primary path, wherein the smoothing algorithm determines Bezier curves for each segment of the plurality of segments along the primary path, wherein determining a Bezier curve for a segment of the primary path comprises:
            generating an initial Bezier curve for the segment based on a set of control points along the segment;
            determining whether the initial Bezier curve collides with an obstacle within the environment; and
            responsive to determining that the initial Bezier curve collides with an obstacle within the environment:
                adding an additional control point to the set of control points, wherein the additional control point is a point within an area around a midpoint of the segment that is furthest from obstacles within the environment;
                generating a new Bezier curve based on the set of control points with the additional control point; and
                determining whether the new Bezier curve collides with an obstacle within the environment;
    determining, based motion capabilities of the autonomous mobile robot, whether the autonomous mobile robot is capable of traversing the primary path;
    in response to determining that the autonomous mobile robot is not capable of traversing the primary path, identifying a portion of the primary path that the autonomous mobile robot is not capable of traversing;
    determining a secondary path around the identified portion of the primary path by:
        identifying a first point on the primary path before the identified portion of the primary path;
        identifying a second point of the primary path after the identified portion of the primary path; and
        determining a secondary path from the identified first point to the identified second point based on the obstacles, the motion capabilities, and contours of the primary path;
    and
    causing the autonomous mobile robot to travel from the start pose to the end pose along the secondary path and then the primary path, wherein causing the autonomous mobile robot to travel from the start pose to the end pose comprises:
        causing the autonomous mobile robot to travel from the start pose to the first point along the primary path;
        causing the autonomous mobile robot to travel from the first point to the second point along the secondary path; and
        causing the autonomous mobile robot to travel from the second point to the end pose along the primary path.

2. The method of claim 1, wherein:
    determining whether the autonomous mobile robot is capable of traversing the primary path comprises determining whether the autonomous mobile robot is in a correct orientation at the start pose to enter the primary path; and
    determining the secondary path from the first point to the second point comprises determining a path from the start pose to the second point.

3. The method of claim 1, wherein:
    determining whether the autonomous mobile robot is capable of traversing the primary path comprises determining whether the autonomous mobile robot can achieve an orientation of the end pose based on the primary path and the motion capabilities of the autonomous mobile robot; and
    determining the secondary path from the first point to the second point comprises:
        determining a path from the first point to the end pose.

4. The method of claim 1, wherein the primary path is optimized based on costs associated with coordinates within the environment, wherein the cost for a coordinate is based on a nearest obstacle to the coordinate.

5. The method of claim 4, wherein the cost for a coordinate is proportional with the distance to a nearest obstacle to the coordinate.

6. The method of claim 1, wherein the primary path is determined by applying a primary pathfinding algorithm and the secondary path is determined by applying a secondary pathfinding algorithm, where the primary pathfinding algorithm is different from the secondary pathfinding algorithm.

7. The method of claim 6, wherein the primary pathfinding algorithm is less computationally expensive than the secondary pathfinding algorithm.

8. The method of claim 6, wherein the primary pathfinding algorithm comprises an A* search algorithm.

9. The method of claim 6, wherein the secondary pathfinding algorithm comprises a search over a set of motion primitives associated with the robot.

10. A non-transitory, computer-readable medium comprising one or more instructions that, when executed by one or more processors, cause the one or more processors to perform operations, the instructions comprising instructions to:
    determine, for an autonomous mobile robot at a start pose, a primary path to an end pose of an environment, the primary path optimized based on obstacles within the environment, wherein determining the primary path comprises:
        generating a primary path from the start pose to the end pose, wherein the primary path comprises a plurality of segments of the primary path; and
        applying a smoothing algorithm to each segment of the plurality of segments of the primary path, wherein the smoothing algorithm determines Bezier curves for each segment of the plurality of segments along the primary path, wherein determining a Bezier curve for a segment of the primary path comprises:
            generating an initial Bezier curve for the segment based on a set of control points along the segment;
            determining whether the initial Bezier curve collides with an obstacle within the environment; and
            responsive to determining that the initial Bezier curve collides with an obstacle within the environment:
                adding an additional control point to the set of control points, wherein the additional control point is a point within an area around a midpoint of the segment that is furthest from obstacles within the environment;
                generating a new Bezier curve based on the set of control points with the additional control point; and
                determining whether the new Bezier curve collides with an obstacle within the environment;
    determine, based motion capabilities of the autonomous mobile robot, whether the autonomous mobile robot is capable of traversing the primary path;
    in response to determining that the autonomous mobile robot is not capable of traversing the primary path, identify a portion of the primary path that the autonomous mobile robot is not capable of traversing;
    determine a secondary path around the identified portion of the primary path by:
        identifying a first point on the primary path before the identified portion of the primary path;
        identifying a second point of the primary path after the identified portion of the primary path; and
        determining a secondary path from the identified first point to the identified second point based on the obstacles, the motion capabilities, and contours of the primary path; and
    cause the autonomous mobile robot to travel from the start pose to the end pose along the secondary path and then the primary path, wherein causing the autonomous mobile robot to travel from the start pose to the end pose comprises:
        causing the autonomous mobile robot to travel from the start pose to the first point along the primary path;
        causing the autonomous mobile robot to travel from the first point to the second point along the secondary path; and
        causing the autonomous mobile robot to travel from the second point to the end pose along the primary path.

11. The computer-readable medium of claim 10, wherein:
the instructions for determining whether the autonomous mobile robot is capable of traversing the primary path comprise instructions that cause the one or more processors to: determine whether the autonomous mobile robot is in a correct orientation at the start pose to enter the primary path; and
the instructions for determining the secondary path from the first point to the second point comprises comprise instructions that cause the one or more processors to: determine a path from the start pose to the second point.

12. The computer-readable medium of claim 10, wherein:
the instructions for determining whether the autonomous mobile robot is capable of traversing the primary path comprise instructions that cause the one or more processors to: determine whether the autonomous mobile robot can achieve an orientation of the end pose based on the primary path and the motion capabilities of the autonomous mobile robot; and
the instructions for determining the secondary path from the first point to the second point comprise instructions that cause the one or more processors to: determine a path from the first point to the end pose.

13. The computer-readable medium of claim 10, wherein the primary path is determined by applying a primary pathfinding algorithm and the secondary path is determined by applying a secondary pathfinding algorithm, where the primary pathfinding algorithm is different from the secondary pathfinding algorithm.

14. The computer-readable medium of claim 13, wherein the primary pathfinding algorithm is less computationally expensive than the secondary pathfinding algorithm.

* * * * *